United States Patent
Waumans et al.

(10) Patent No.: US 10,245,866 B2
(45) Date of Patent: Apr. 2, 2019

(54) COLOUR IMAGING OF SECURITY DOCUMENT PRECURSORS

(71) Applicant: AGFA-GEVAERT, Mortsel (BE)

(72) Inventors: Bart Waumans, Mortsel (BE); Paul Callant, Mortsel (BE); Bart Aerts, Mortsel (BE)

(73) Assignee: AGFA-GEVAERT, Mortsel (BE)

( * ) Notice: Subject to any disclaimer, the term of this patent is extended or adjusted under 35 U.S.C. 154(b) by 0 days.

(21) Appl. No.: 14/441,603

(22) PCT Filed: Nov. 5, 2013

(86) PCT No.: PCT/EP2013/073014
§ 371 (c)(1),
(2) Date: May 8, 2015

(87) PCT Pub. No.: WO2014/072275
PCT Pub. Date: May 15, 2014

(65) Prior Publication Data
US 2015/0306887 A1 Oct. 29, 2015

Related U.S. Application Data

(60) Provisional application No. 61/726,594, filed on Nov. 15, 2012.

(30) Foreign Application Priority Data

Nov. 12, 2012 (EP) .................................. 12192155

(51) Int. Cl.
*B42D 25/30* (2014.01)
*B42D 25/41* (2014.01)
(Continued)

(52) U.S. Cl.
CPC ............. *B41M 3/142* (2013.01); *B32B 27/36* (2013.01); *B41J 2/435* (2013.01); *B41J 2/4753* (2013.01);
(Continued)

(58) Field of Classification Search
CPC .......... B42D 25/30; B42D 25/41; B41M 3/14; B41M 2205/42; B32B 27/36; B41J 2/4753
See application file for complete search history.

(56) References Cited

U.S. PATENT DOCUMENTS

| 4,720,449 A | 1/1988 | Borror et al. |
| 5,774,168 A * | 6/1998 | Blome ..................... B41J 2/475 347/262 |

(Continued)

FOREIGN PATENT DOCUMENTS

| EP | 0 537 484 A1 | 4/1993 |
| EP | 2 181 851 A1 | 5/2010 |

(Continued)

OTHER PUBLICATIONS

Official Communication issued in International Patent Application No. PCT/EP2013/073014, dated Dec. 17, 2013.

*Primary Examiner* — Kristal Feggins
*Assistant Examiner* — Kendrick Liu
(74) *Attorney, Agent, or Firm* — Keating and Bennett, LLP (57) ABSTRACT

A method of producing a security document includes the steps of producing a first part of a color image by color laser marking a security document precursor; and producing a second part of the color image by a second imaging technique different from laser marking. The resulting security document is more difficult to falsify.

17 Claims, 2 Drawing Sheets

(51) Int. Cl.

| | | |
|---|---|---|
| *B41M 3/14* | (2006.01) | |
| *B32B 27/36* | (2006.01) | |
| *B41J 2/475* | (2006.01) | |
| *B41J 3/407* | (2006.01) | |
| *B41J 2/435* | (2006.01) | |
| *B41J 3/54* | (2006.01) | |
| *B42D 25/40* | (2014.01) | |

(52) U.S. Cl.
CPC .............. *B41J 3/407* (2013.01); *B41J 3/546* (2013.01); *B42D 25/30* (2014.10); *B42D 25/40* (2014.10); *B42D 25/41* (2014.10); *B41M 2205/42* (2013.01)

(56) References Cited

U.S. PATENT DOCUMENTS

| | | | | |
|---|---|---|---|---|
| 5,885,926 | A | * | 3/1999 | Matsumoto ............ B41M 5/287 503/204 |
| 2003/0234286 | A1 | * | 12/2003 | Labrec .................... B41M 3/14 235/380 |
| 2003/0234292 | A1 | * | 12/2003 | Jones ...................... B41M 3/14 235/491 |
| 2006/0030484 | A1 | * | 2/2006 | Kim ........................ B41M 5/30 503/204 |
| 2008/0284157 | A1 | * | 11/2008 | Muke ...................... B41M 3/14 283/86 |
| 2009/0201321 | A1 | | 8/2009 | Halfyard et al. |
| 2010/0295290 | A1 | * | 11/2010 | Muth ..................... B32B 27/06 283/109 |
| 2011/0000967 | A1 | * | 1/2011 | Labrec .................. G06K 19/08 235/488 |
| 2011/0207603 | A1 | * | 8/2011 | Kawahara .............. B41M 5/305 503/201 |

FOREIGN PATENT DOCUMENTS

| EP | 2 181 858 A1 | 5/2010 |
|---|---|---|
| EP | 2 332 738 A1 | 6/2011 |
| WO | 2009/106036 A2 | 9/2009 |

* cited by examiner

COLOUR IMAGING OF SECURITY DOCUMENT PRECURSORS

CROSS-REFERENCE TO RELATED APPLICATIONS

This application is a 371 National Stage Application of PCT/EP2013/073014, filed Nov. 5, 2013. This application claims the benefit of U.S. Provisional Application No. 61/726,594, filed Nov. 15, 2012, which is incorporated by reference herein in its entirety. In addition, this application claims the benefit of European Application No. 12192155.5, filed Nov. 12, 2012, which is also incorporated by reference herein in its entirety.

BACKGROUND OF THE INVENTION

1. Field of the Invention

This invention relates to colour imaging of security document precursors with the aim of producing security documents that are difficult to falsify.

2. Description of the Related Art

Articles are laser marked in order to ensure product safety and authenticity. For example, packaging material of pharmaceuticals is laser marked to enable a consumer to verify the genuineness of a product. Laser marked security cards are widely used for various applications such as identification purposes (ID cards) and financial transfers (credit cards). Such cards typically consist of a laminated structure consisting of various papers or plastic laminates and layers wherein some of them may carry alphanumeric data and a picture of the card holder. So called 'smart cards' can also store digital information by including an electronic chip in the card body.

A principal objective of such articles and security cards is that they cannot be easily modified or reproduced in such a way that the modification or reproduction is difficult to distinguish from the original Two techniques frequently used for preparing security documents are laser marking and laser engraving. In literature, laser engraving is often incorrectly used for laser marking. In laser marking an article, a colour change is observed by local heating of material in the bulk of the article, while in laser engraving material is removed by ablation.

Today, laser marking employed in the manufacture of security documents consists solely of a "black" laser marking method via the carbonization of a polymer, usually polycarbonate as disclosed in e.g. EP 2181858 A (AGFA). There has been considerable interest in being able to produce colour images through laser marking.

U.S. Pat. No. 4,720,449 (POLAROID) discloses a thermal imaging method for producing colour images on a support carrying at least one layer of a colourless compound, such as di- or triarylmethane, by conversion of electromagnetic radiation into heat. The laser beams may have different wavelengths in a range above 700 nm with at least about 60 nm apart so that each imaging layer having a different infrared absorber may be exposed separately to convert a colourless triarylmethane compound into a coloured form.

WO 2009/106036 A (BUNDESDRUCKEREI) discloses a method for producing a security and value document containing a polymer laminate formed from a basic polymer laminate and a polymer coating. The polymer coating has a printable substrate layer that can absorb a diffusible ink printed by thermosublimation or inkjet printing. The polymer laminate can be laser marked through pyrolysis (carbonization).

EP 2181851 A (AGFA) discloses that a dye image in a dye diffusion transfer image receptor layer comprising a polymeric mordant could be laser engraved, while no laser engraving appeared to be possible with dye images obtained with other imaging techniques such as thermal dye sublimation and inkjet.

EP 2332738 A (AGFA) discloses the laser perforation of a security document precursor with two or more holes near a perimeter edge surface of the precursor, wherein at least one of the holes is filled with a coloured material by e.g. inkjet ink printing, so that the coloured material is visible from a direction perpendicular on the perimeter edge surface.

US 2009201321 A (XEROX) discloses a system integrating a digital press with an ink jet device to form a security document including a xerographic portion and an invisible inkjet ink portion, in order to produce documents in a continuous inline process.

Since methods for falsification and counterfeiting of security documents also continue to develop and improve, it remains a constant battle to protect security documents against falsification and counterfeiting by developing new security features and methods of securing such documents. There remains a need for multicolour laser markable articles which are difficult to falsify.

SUMMARY OF THE INVENTION

In order to overcome the problems described above, preferred embodiments of the present invention provide a method of producing a security document including the steps of a) producing a first part of a colour image by colour laser marking a security document precursor; and
b) producing a second part of the colour image by a second imaging technique different from laser marking.

The present invention provides a method wherein two colour imaging techniques are used to compose a single colour image. The use of different imaging techniques require that the images of both imaging techniques are positioned carefully in register to each other. Misalignment of the images composing the colour image is immediately visible upon inspection.

Another advantage is that by using different imaging techniques that colours which are difficult to reproduce by one imaging technique can be reproduced by the second imaging technique. For example, spot colours like Coca Cola™ red or IBM™ blue can be easily reproduced by UV curable inkjet printing in the second part of the colour image, while this may be a challenge in reproducing them by colour laser marking.

Further advantages and preferred embodiments of the present invention will become apparent from the following description.

BRIEF DESCRIPTION OF THE DRAWINGS

FIG. 1, a. shows a cross section of an embodiment of a colour laser markable laminate 11 including two colour laser markable layers 16 and 17 on a transparent polymeric support 15 being simultaneously laminated between an opaque core support 14 and a polymeric overlay 18, and b. shows a cross section of the end result, i.e. a laser markable precursor 13 obtained by the lamination in a.

DETAILED DESCRIPTION OF THE PREFERRED EMBODIMENTS

Figure 1:
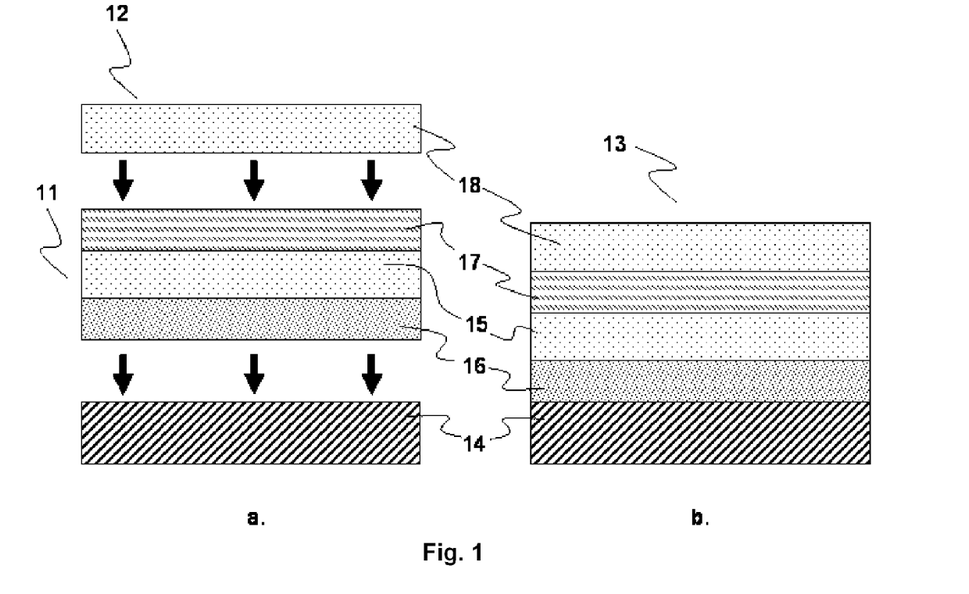
Figure 2:
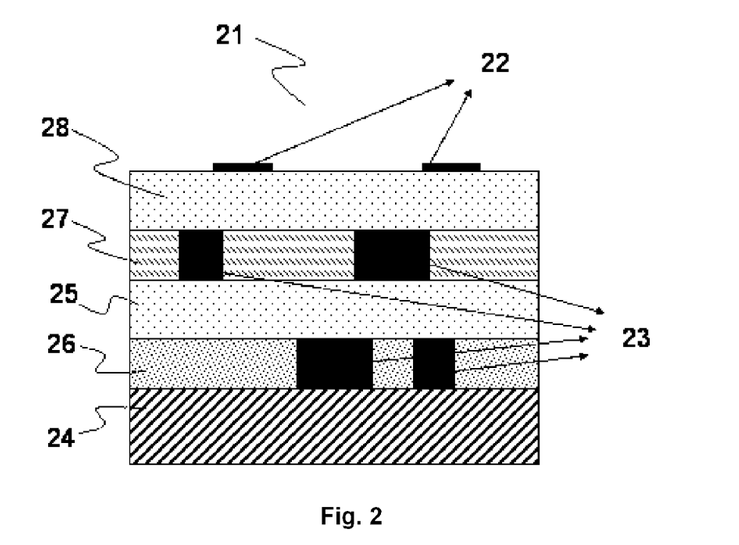
FIG. 2 shows a cross section of a security document 21 including, in order, a core support 24, a colour laser markable layer 26, a transparent polymeric support 25, a colour laser markable layer 27, and a polymeric overlay 28. The security document 21 contains colour laser markings 23 in the colour laser markable layers 26 and 27, and contains UV curable inkjet ink markings 22. The colour laser markings 23 and the UV curable inkjet ink markings 22 together form a single colour image.
Figure 3:
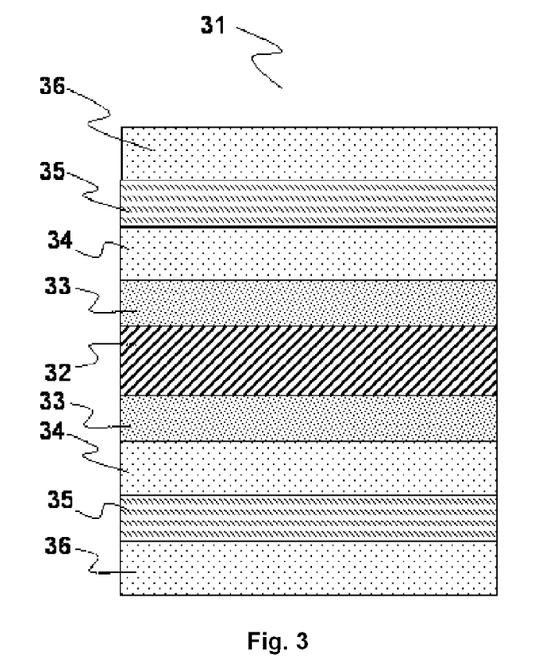
FIG. 3 shows a symmetrical security document precursor including on both sides of an opaque core 32, a colour laser markable layer 33, a transparent polymeric support 34, a colour laser markable layer 35, and a polymeric overlay 36.
Figure 4:
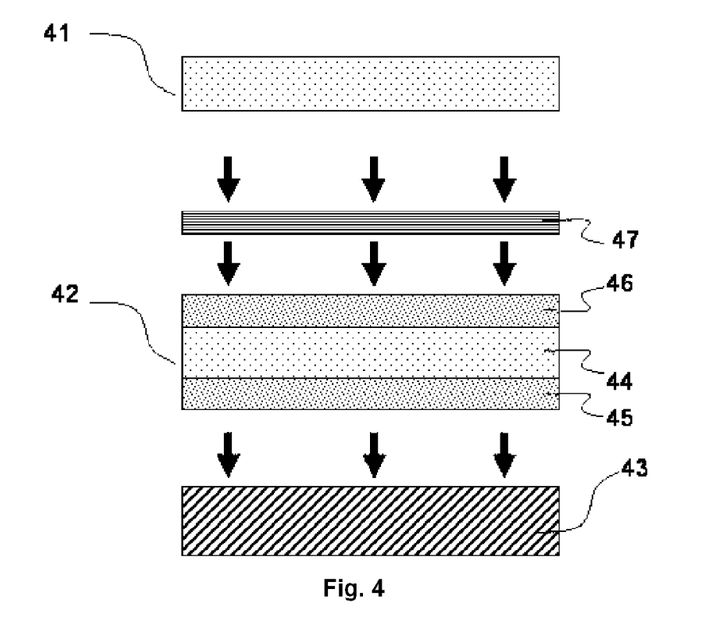
FIG. 4 shows the interlamination of a hologram 47 between a polymeric overlay 41 and a security laminate 42 including two colour laser markable layers 45 and 46 on a transparent polymeric support 44, all being laminated onto a core support 43.

The terms "polymeric support" and "foil", as used herein, mean a self-supporting polymer-based sheet, which may be associated with one or more adhesion layers e.g. subbing layers. Supports and foils are usually manufactured through extrusion.

The term "layer", as used herein, is considered not to be self-supporting and is manufactured by coating it on a (polymeric) support or foil.

The term "leuco dye" as used herein refers to compounds which can change from essentially colourless to coloured when heated.

"PET" is an abbreviation for polyethylene terephthalate.

"PETG" is an abbreviation for polyethylene terephthalate glycol, the glycol indicating glycol modifiers which are incorporated to minimize brittleness and premature aging that occur if unmodified amorphous polyethylene terephthalate (APET) would be used in the production of cards.

"PET-C" is an abbreviation for crystalline PET, i.e. a biaxially stretched polyethylene terephthalate. Such a polyethylene terephthalate support has excellent properties of dimensional stability.

The definition of "security feature" corresponds with the normal definition as adhered to in the "Glossary of Security Documents—Security features and other related technical terms" as published by the Consilium of the Council of the European Union on Sep. 12, 2012 (Version: v. 09916-08.R.2.C.1.en) on its website:
http://www.consilium.europa.eu/prado/EN/glossaryPopup.html.

The term "alkyl" means all variants possible for each number of carbon atoms in the alkyl group i.e. methyl, ethyl, for three carbon atoms: n-propyl and isopropyl; for four carbon atoms: n-butyl, 1-isobutyl, 2-isobutyl and tertiary-butyl; for five carbon atoms: n-pentyl, 1,1-dimethyl-propyl, 2,2-dimethylpropyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_2$ to $C_6$-alkenyl group.

Unless otherwise specified a substituted or unsubstituted alkynyl group is preferably a $C_2$ to $C_6$-alkynyl group.

Unless otherwise specified a substituted or unsubstituted aralkyl group is preferably phenyl group or naphthyl group including one, two, three or more $C_1$ to $C_6$-alkyl groups.

Unless otherwise specified a substituted or unsubstituted alkaryl group is preferably a $C_1$ to $C_6$-alkyl group including an aryl group, preferably a phenyl group or naphthyl group.

Unless otherwise specified a substituted or unsubstituted aryl group is preferably a substituted or unsubstituted phenyl group or naphthyl group.

A cyclic group includes at least one ring structure and may be a monocyclic- or polycyclic group, meaning one or more rings fused together.

A heterocyclic group is a cyclic group that has atoms of at least two different elements as members of its ring(s). The counterparts of heterocyclic groups are homocyclic groups, the ring structures of which are made of carbon only. Unless otherwise specified a substituted or unsubstituted heterocyclic group is preferably a five- or six-membered ring substituted by one, two, three or four heteroatoms, preferably selected from oxygen atoms, nitrogen atoms, sulphur atoms, selenium atoms or combinations thereof.

An alicyclic group is a non-aromatic homocyclic group wherein the ring atoms consist of carbon atoms.

The term "heteroaryl group" means a monocyclic- or polycyclic aromatic ring comprising carbon atoms and one or more heteroatoms in the ring structure, preferably, 1 to 4 heteroatoms, independently selected from nitrogen, oxygen, selenium and sulphur. Preferred examples of heteroaryl groups include, but are not limited to, pyridinyl, pyridazinyl, pyrimidyl, pyrazyl, triazinyl, pyrrolyl, pyrazolyl, imidazolyl, (1,2,3,)- and (1,2,4)-triazolyl, pyrazinyl, pyrimidinyl, tetrazolyl, furyl, thienyl, isoxazolyl, thiazolyl, isoxazolyl, and oxazolyl. A heteroaryl group can be unsubstituted or substituted with one, two or more suitable substituents. Preferably, a heteroaryl group is a monocyclic ring, wherein the ring comprises 1 to 5 carbon atoms and 1 to 4 heteroatoms.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms.

Unless otherwise specified a substituted alkyl group, a substituted alkenyl group, a substituted alkynyl group, a substituted aralkyl group, a substituted alkaryl group, a substituted aryl, a substituted heteroaryl and a substituted heterocyclic group are preferably substituted by one or more substituents selected from the group consisting of methyl, ethyl, n-propyl, isopropyl, n-butyl, 1-isobutyl, 2-isobutyl and tertiary-butyl, ester, amide, ether, thioether, ketone, aldehyde, sulfoxide, sulfone, sulfonate ester, sulphonamide, —Cl, —Br, —I, —OH, —SH, —CN and —$NO_2$.

Methods for Producing Security Documents

A preferred embodiment of the present invention is a method of producing a security document including the steps of: a) producing a first part of a colour image by colour laser marking a security document precursor; and b) producing a second part of the colour image by a second imaging technique different from laser marking.

In a preferred embodiment of the method, the second part of the colour image includes one or more chromatic colours. Achromatic colours are white, black and grey, i.e. having no particular hue.

In a preferred embodiment of the method, the first part of the colour image is made by colour laser marking two colour laser markable layers producing different colours, more preferably one colour laser markable layer producing a cyan or blue colour and the other colour laser markable layer producing a magenta or red colour, while the second part of the colour image is made by a second imaging technique providing the complementary colour yellow or green, more preferably yellow. The integration of the three colours e.g. cyan, magenta and yellow, provides a full colour image of chromatic colours.

The one or more chromatic colours in the second part of the colour image may include a spot colour. A spot colour is a custom colour, e.g. Coca Cola™ red or IBM™ blue, which may be very difficult to match using the colour laser marking imaging technique. Such spot colours can be applied much more easily by using specific colour dyes or pigments by e.g. inkjet printing or thermosublimation printing.

The imaging technique used for producing the second part of the colour image is an imaging technique different from laser marking. Using a laser for the second part of the colour image makes falsification much easier, since the alignment of the first and second parts of the colour image requires only a minor adaptation of laser optics. By using a different imaging technique for the second part of the colour image, the exact alignment of the first and second parts of the colour image becomes much more difficult. In principle, a forger only has one opportunity to falsify a security document, thus by limiting the number of trials for aligning the first and second parts of the colour image the security of a security document is enhanced.

There is no real limitation on the type of the second imaging technique, but preferably the second imaging technique is a technique allowing variable data to be applied. A preferred second imaging technique allowing variable data printing is inkjet printing, more preferably UV curable inkjet printing. UV curable inkjet printing does not require the presence of a specific ink-absorbing layer on the polymeric overlay contrary to aqueous or solvent inkjet printing. Other preferred second imaging techniques include xerography and particularly thermosublimation printing.

These imaging techniques are well-known to a person skilled in the art and also commercially available. For example, the Zebra™ P310i is a reliable security card printer for applying single side thermosublimation or thermotransfer prints in monochrome or four colors.

Security Document Precursors

The security document precursors includes preferably one or two colour laser markable layers on a transparent polymeric support, more preferably on the same transparent polymeric support wherein one colour laser markable layer is present on one side of the transparent polymeric support and the other colour laser markable layer is present on the opposite side.

In a preferred embodiment of the security document precursor, the two colour laser markable layers, wherein the colour laser markable layer closest to the core support includes an infrared dye IR-1 with a maximum absorption in the infrared region at the wavelength $\lambda_{max}$(IR-1), while the other colour laser markable layer includes an infrared dye IR-2 with a maximum absorption in the infrared region at the wavelength $\lambda_{max}$(IR-2)

$\lambda_{max}$(IR) is the wavelength of the absorption maximum in the infrared spectrum from 700 to 1500 nm. The $\lambda_{max}$(IR-1) and $\lambda_{max}$(IR-2) are preferably measured by absorption spectroscopy on a coated layer, since the value of $\lambda_{max}$ may differ somewhat, although usually no more than 10 nm, on the type of solvent used in an infrared dye solution.

In a preferred embodiment of the security document precursor, the condition is fulfilled that of 800 nm<$\lambda_{max}$(IR-2)<1000 nm, preferably 830 nm<$\lambda_{max}$(IR-2)<980 nm, more preferably 850 nm<$\lambda_{max}$(IR-2)<960 nm and most preferably 900 nm<$\lambda_{max}$(IR-2)<940 nm.

In a preferred embodiment, the infrared dye IR-1 has an absorption maximum in the infrared region $\lambda_{max}$(IR-1)≥1000 nm, more preferably $\lambda_{max}$(IR-1)≥1020 nm and most preferably $\lambda_{max}$(IR-1)≥1040 nm.

A security document is obtained after colour laser marking and imaging a security document precursor with the second imaging technique. The security document is preferably selected from the group consisting of a passport, a personal identification card and a product identification document.

In a preferred embodiment, the security document has a format as specified by ISO 7810. ISO 7810 specifies three formats for identification documents: ID-1 with the dimensions 85.60 mm×53.98 mm, and a thickness of 0.76 mm as specified in ISO 7813, as used for bank cards, credit cards, driving licenses and smart cards; ID-2 with the dimensions 105 mm×74 mm, as used in German identity cards, with typically a thickness of 0.76 mm; and ID-3 with the dimensions 125 mm×88 mm, as used for passports and visa's. When the security cards include one or more contactless integrated circuits then a larger thickness is tolerated, e.g. 3 mm according to ISO 14443-1. In another preferred embodiment, the color laser marked article is a security document including electronic circuitry, more preferably the electronic circuitry includes a RFID chip with an antenna and/or a contact chip. Inclusion of electronic circuitry makes forgery more difficult.

The security document precursor may include three or more color laser markable layers for increasing the color gamut. In a preferred embodiment of the security document precursor, two color laser markable layers each include a different leuco dye for forming a color having an absorption maximum $\lambda_{max}$(VIS-1) and $\lambda_{max}$(VIS-2) in the visible spectrum of 400 nm to 700 nm. Preferably the relations a) and b) are fulfilled: a) 500 nm<$\lambda_{max}$(VIS-1)<600 nm and b) 600 nm<$\lambda_{max}$(VIS-2)<700 nm.

In addition to the colors formed from the leuco dyes, it is preferred that the security document precursor is also capable of producing a black color.

In a preferred embodiment, the black color is produced by using the infrared laser, preferably the infrared laser used for the color laser markable layer capable of forming a cyan or blue color image on laser marking, in different laser operation modes as disclosed by WO 2012/076493 (AGFA). The advantage of using the infrared laser of the color laser markable layer forming a cyan or blue color image is that a neutral black color is formed which is more appealing than a brownish black color which would be formed on using the infrared laser for the color laser markable layer capable of forming e.g. a yellow or a magenta color image on laser marking.

In a more preferred embodiment, the security document precursor includes a laser markable polymeric support or a laser markable layer for generating a black color as disclosed by EP 2463109 A (AGFA) also capable of producing different shades of black. The laser markable polymeric support for generating a black color may be an additional foil or laminate, but is preferably the (opaque) core support or a transparent polymeric support of the color laser markable layer.

The security document precursor is preferably to a large degree symmetrical or more preferably completely symmetrical. Completely symmetrical means that the same type and number of layers and foils are present on both sides of the core support. The advantage thereof is that curl of the security document precursor is minimized. An asymmetrical security document precursor often exhibits curl and usually requires a thermal relaxation in order to obtain e.g. a flat asymmetrical ID card.

In a preferred embodiment, the security document precursor includes one or more biaxially stretched polyester films, more preferably the outermost films or polymeric overlays of the security document precursor are biaxially stretched polyester films. By using biaxially stretched polyester, preferably biaxially stretched polyethylene terephthalate overlays, the one or more colour laser markable layers for producing the first part of the colour image by colour laser marking are adequately protected against falsification due to being located between two biaxially stretched polyester films.

Color Laser Markable Layers

The color laser markable layers preferably contain an infrared dye for the conversion of electromagnetic radiation into heat when the color laser markable layer is exposed by the infrared laser.

A color laser markable layer includes preferably at least an infrared dye, a polymeric binder and a substantially colorless compound, preferably a leuco dye. Color is produced in the color laser markable layer by a chemical reaction converting the substantially colorless compound into a dye, wherein the chemical reaction is triggered by local heating with an infrared laser having an emission wavelength matching the absorption maximum of the infrared dye. Preferably, a laser emission wavelength is selected within a range of ±30 nm of the absorption maximum in the infrared region $\lambda_{max}$(IR) of the infrared dye.

The infrared dye not only delivers the heat for the color forming action, but also has the advantage that there is no or minimal absorption in the visible spectrum and thus there is no or minimal interference with the color formed by the laser markable layer. This makes a pure white background possible, which is often desired in a security document.

The color laser markable layers can be coated onto a support by any conventional coating technique, such as dip coating, knife coating, extrusion coating, spin coating, slide hopper coating and curtain coating. Preferably the laser markable layer is coated with a slide hopper coater or a curtain coater, more preferably coated onto a transparent polymeric support including a subbing layer.

The dry thickness of the color laser markable layer is preferably between 4 and 40 g/m², more preferably between 5 and 25 g/m², and most preferably between 6 and 15 g/m².

Infrared Dyes

The color laser markable layers include different infrared dyes and color forming compounds. The infrared dyes differ in wavelength of maximum absorption $\lambda_{max}$ so that they can be addressed by different infrared lasers with corresponding emission wavelengths causing color formation only in the color laser markable layer of the addressed infrared dye.

The color laser marked article preferably contains two color laser markable layers having different infrared dyes and different leuco dyes on the same side of a core support for producing a multi-colored article. The different infrared dyes have an absorption maximum in the infrared region which differs preferably by at least 60 nm, more preferably at least 80 nm and most preferably at least 100 nm.

Suitable examples of infrared dyes include, but are not limited to, polymethyl indoliums, metal complex IR dyes, indocyanine green, polymethine dyes, croconium dyes, cyanine dyes, merocyanine dyes, squarylium dyes, chalcogenopyryloarylidene dyes, metal thiolate complex dyes, bis(chalcogenopyrylo)polymethine dyes, oxyindolizine dyes, bis(aminoaryl)polymethine dyes, indolizine dyes, pyrylium dyes, quinoid dyes, quinone dyes, phthalocyanine dyes, naphthalocyanine dyes, azo dyes, (metalized) azomethine dyes and combinations thereof.

The infrared dye is preferably present in the color laser markable layer in an amount of 0.01 to 1.0 g/m², more preferably in an amount of 0.02 to 0.5 g/m² and most preferably in an amount of 0.05 to 0.2 g/m². An amount of less than 0.01 g/m² requires a too high laser power and an amount of more than 0.5 g/m² may result in background discoloration.

In a preferred embodiment, the infrared dye for the colour laser markable closest to the core support is selected from the group consisting of quinoline dyes, indolenine dyes, especially a benzo[cd]indoline dye. Such infrared dyes preferably absorb above 1000 nm.

A particular preferred infrared dye is 5-[2,5-bis[2-[1-(1-methylbutyl)benz[cd]indol-2(1H)-ylidene]ethylidene]cyclopentylidene]-1-butyl-3-(2-methoxy-1-methylethyl)-2,4,6 (1H,3H,5H)-pyrimidinetrione (CASRN 223717-84-8), which has an absorption maximum $\lambda_{max}$ of 1052 nm making it very suitable for a Nd-YAG laser having an emission wavelength of 1064 nm.

In a preferred embodiment, the infrared dye for the outermost colour laser markable layer is selected from the group consisting of quinoline dyes, indolenine dyes, especially benzo[e]indolenine dyes, and benzo[f]indolenine dyes. Such infrared dyes preferably absorb below 1000 nm.

Polymeric Binders

The color laser markable layer includes a polymeric binder. There is no real limitation on the type of polymeric binder for so far it allows color formation.

For color laser marking, the laser markable layer preferably includes a polymeric binder comprising vinyl acetate and at least 85 wt % of vinyl chloride based on the total weight of the binder. Particularly preferred polymeric binders are disclosed in EP 2463110 A (AGFA).

The polymeric binder in the laser markable layer is preferably a copolymer including at least 85 wt % of a vinyl chloride and 1 wt % to 15 wt % of vinyl acetate, more preferably a copolymer including at least 90 wt % of a vinyl chloride and 1 wt % to 10 wt % of vinyl acetate with all wt % based on the total weight of the binder.

In a preferred embodiment, the polymeric binder includes at least 4 wt % of vinyl acetate based on the total weight of the binder. The advantage of having at least 4 wt % of vinyl acetate in the polymeric binder is that the solubility of the polymeric binder is drastically improved in preferred coating solvents, such as methyl ethyl ketone.

In a more preferred embodiment, the polymeric binder consists of vinyl chloride and vinyl acetate.

If the color laser marked article includes a laser markable layer for producing a black color through carbonization of the polymeric binder then the polymeric binder is preferably selected from polycarbonate (PC), polybutylene terephthalate (PBT), polyvinyl chloride (PVC), polystyrene (PS) and copolymers thereof, such as e.g. aromatic polyester-carbonate, styrene acrylonitrile and acrylonitrile butadiene styrene (ABS).

The polymeric binder is preferably present in the color laser markable layer in an amount of 3 to 30 g/m², more preferably in an amount of 5 to 20 g/m².

Leuco Dyes

A leuco dye is a compound which changes from essentially colorless to colored when heated, e.g. by laser marking. A number of classes of leuco dyes are preferred for the laser markable layer of the present invention, for example: azines such as oxazines, diazines and thiazines; triarylmeth- anes such as fluoresceins, rhodamines and rhodols; ketazines; barbituric acid leuco dyes and thiobarbituric acid leuco dyes.

The leuco dye is preferably present in the color laser markable layer in an amount of 0.5 to 5.0 g/m², more preferably in an amount of 1.0 to 3.0 g/m².

The following reaction mechanisms and leuco dyes are suitable to form a colored dye.

1. Fragmentation of a Leuco Dye

The reaction mechanism can be represented by:

Leuco dye-FG→Dye wherein FG represents a fragmenting group.

A preferred leuco dye (CASRN104434-37-9) is shown in EP 174054 A (POLAROID) which discloses a thermal imaging method for forming color images by the irreversible unimolecular fragmentation of one or more thermally unstable carbamate moieties of an organic compound to give a visually discernible color shift from colorless to colored.

The fragmentation of a leuco dye may be a two-step reaction mechanism represented by:

Leuco-dye-FG→[Leuco-dye]→Colored Dye wherein FG represents a fragmenting group.

The fragmentation of a leuco dye may be catalyzed or amplified by acids and acid generating agents. The leuco dyes G-(1) to G-(17) disclosed by U.S. Pat. No. 6,100,009 (FUJI) are catalyzed or amplified by polymeric acid generating agents based on A-(1) to A-(52), which are also suitable as acid generating agents in the present invention.

2. Protonation of a Leuco Dye after Fragmentation of a H-Donor-Precursor The reaction mechanism can be represented by:

Leuco-dye+H-donor-FG→Leuco-dye+H-donor→Colored Dye wherein FG represents a fragmenting group.

A preferred H-donor-FG compound includes an ester group as part of its chemical structure (the rest of the compound is represented by the group T) which by laser heating forms a carboxylic acid group:

A more preferred H-donor-precursor includes a carbonate group, e.g. a tBOC group, as part of its chemical structure (the rest of the compound is represented by the group T) which by laser heating forms a phenol group:

Preferred carbonate groups are given on page 8 of EP 605149 A (JUDO PAPER). In a preferred embodiment, the H-donor-FG compound contains 2 carbonate groups.

The most preferred H-donor-FG compound is:

HDP

The synthesis of compound HDP (CASRN 129104-70-7) is given on page 31 of EP 605149 A (JUJO PAPER) for the compound (19).

In addition to the H-donor, the fragmentation of the H-donor-FG compound above also leads to the formation of a compound having a melting temperature lower than room temperature (20° C.). The formation of such a compound can be used as an additional security feature. After laser marking a laser markable article through a polymeric support, such as a biaxially stretched polyethylene terephthalate polymeric foil, the compound having a melting temperature lower than room temperature may disturb a second laser marking (falsification of a security document) by the formation of visible blisters.

3. Protonation of a Leuco Dye after a Re-Arrangement in a H-Donor-Precursor The reaction mechanism can be represented by:

Leuco-dye+H-donor-RG→Leuco-dye+
H-donor→Colored Dye wherein RG represents a rearranging group.

A preferred H-donor-RG compound is capable of forming a compound having an allyl substituted phenol group as part of its chemical structure (the rest of the compound is represented by the group T) by laser heating:

Preferred H-donor-RG compounds include 4,4'-diallyloxy diphenylsulfone whereof the synthesis is disclosed by EP 1452334 A (RICOH).

In contrast to the H-donor-FG compound of reaction mechanism 2, no compound having a melting temperature lower than room temperature (20° C.) is produced by the rearrangement of the H-donor-precursor to a hydrogen donor.

The color formation according to the mechanisms 2 and 3 above are two-component reactions involving a leuco dye and a hydrogen donor-precursor, i.e. a 'H-donor-FG compound' or 'H-donor-RG compound', while the first reaction mechanism is an one-component reaction. The advantage of using a two-component reaction for the color formation is that the stability, especially the shelf-life stability, can be enhanced. The probability of undesired color formation due to environment heating is decreased by going from a single step reaction to a two step reaction involving the formation of the H-donor followed by a reaction of the formed H-donor with the leuco dye.

The preferred color formation mechanism is the protonation of a leuco dye after fragmentation of the H-donor since it includes both advantages of the blister formation security feature and the enhanced shelf-life stability.

In a preferred embodiment of the laser markable layer, a combination is used of 4,4'-Bis(tert-butoxycarbonyloxy)diphenylsulfone (CASRN 129104-70-7) as the H-donor-FG compound with the leuco dye crystal violet lactone (CASRN 1552-42-7) for producing a blue color.

In a preferred embodiment of a laser markable layer for producing a cyan color, the cyan color forming compound has a structure according to Formula CCFC:

Formula CCFC

In a preferred embodiment of a laser markable layer for producing a magenta color, the magenta color forming compound has a structure according to Formula MCFC:

Formula MCFC wherein R, R', R" are independently selected from the group consisting of hydrogen, a linear alkyl group, a branched alkyl group, an aryl and aralkyl group; or R' and R" are linked to form a heterocyclic ring.

In one embodiment, the magenta color forming compound has a structure according to Formula MCFC, the R, R', R" may independently represent a linear alkyl group, a branched alkyl group, an aryl or an aralkyl group substituted by at least one functional group containing an oxygen atom, a sulphur atom or a nitrogen atom.

Particularly preferred magenta color forming compounds include the compounds M-1 to M-6 of Table 1.

TABLE 1

M-1

M-2

M-3

M-4

M-5

In a very preferred embodiment of a laser markable layer for producing a magenta color, the magenta color forming compound has a structure according to Formula MCFC2:

M-6

Formula MCFC2

In a preferred embodiment of a laser markable layer for producing a red color, the red color forming compound has a structure according to Formula RCFC:

Formula RCFC

In a preferred embodiment of a laser markable layer for producing a yellow color, the yellow color forming compound has a structure according to Formula YCFC:

Formula YCFC wherein R, R' are independently selected from a group consisting of a linear alkyl group, a branched alkyl group, an aryl and aralkyl group.

In one embodiment, the yellow color forming compound has a structure according to Formula YCFC, wherein R and R' independently represent a linear alkyl group, a branched alkyl group, an aryl or an aralkyl group substituted by at least one functional group containing an oxygen atom, a sulphur atom or a nitrogen atom.

A particularly preferred yellow color forming compound is the compound according to Formula YCFC wherein both R and R' are methyl.

The leuco dye is preferably present in the laser markable layer in an amount of 0.01 to 2.0 g/m², more preferably in an amount of 0.1 to 1.0 g/m².

Thermal Acid Generating Compounds

The fragmentation of a leuco dye in a color laser markable layer according to the present invention may be catalyzed or amplified by acids and acid generating agents.

Suitable thermal acid generating agents may be the polymeric acid generating agents based on the ethylenically unsaturated polymerizable compounds A-(1) to A-(52) disclosed by U.S. Pat. No. 6,100,009 (FUJI).

Suitable non-polymeric acid generating agents are, for example, the compounds E-(1) to E-(90) disclosed by U.S. Pat. No. 6,100,009 (FUJI) lacking the ethylenically unsaturated polymerizable group.

The thermal acid generating agent is preferably present in the amount of 1 to 20 wt %, more preferably 5 to 15 wt % based on the total dry weight of the laser markable layer.

Stabilizers

The color laser markable layer, preferably the outermost color laser markable layer may include at least one stabilizer, preferably a UV stabilizer.

Suitable commercially available stabilizers include 6-O-palmitoyl-L-ascorbic acid (CASRN137-66-6) from BASF; TOCOBLEND™ L70 IP (CASRN1406-66-2) from VITA-BLEND NEDERLAND BV; gallic acid ethyl ester (CASRN831-61-8) from ACROS; 3,6-dithia-1,8-octanediol (CASRN5244-34-8) from ALDRICH; Irganox™ 1035 (CASRN41484-35-9) from CIBA; ADK STAB PEP36 (CASRN80693-00-1) from PALMAROLE; calcium stearate; Tinuvin™ 292 (CASRN 41556-26-7), Tinuvin™ 400 (CASRN 192662-79-6), Tinuvin™ P (CASRN2440-22-4), Tinuvin™ 1130 (CASRN 104810-48-2) and Tinuvin™ 123 (CASRN 122586-52-1) from BASF; Irgastat™ P 18 (CASRN401844-75-5) from CIBA; 1-dibutylacetamido-mercaptotetrazole (CASRN168612-06-4) from Chemosyntha; 1-(3,4-dichlorophenyl)-1,2-dihydro-5H-tetrazole-5-thione (CASRN63684-99-1) from NOVASEP; CYASORB™ UV1164 (CASRN2725-22-6) from CYTEC INDUSTRIES BV; Tinuvin™ 400 (CASRN 192662-79-6); 2-(2,4-dihydroxyphenyl)-4,6-bis-(2,4-dimethylphenyl)-s-triazine (CASRN1668-53-7) from Capot Chemical Ltd; 4-[4,6-bis(2-methylphenoxy)-1,3,5-triazin-2-yl]-1,3-ben- zenediol (CASRN13413-61-1); Mixxim™ BB/100 (CASRN103597-45-1) from FAIRMOUNT; Hostavin™ 3225-2 DISP XP from CLARIANT; and other benzotriazole and benzophenone compounds.

Particularly preferred stabilizers include a phenol stabilizer sterically hindered by a ring containing three nitrogen atoms represented by Formula (Stabi-I):

Stabi-I or Formula (Stabi-II):

Stabi-II wherein

R1 to R7 is each independently selected from the group consisting of hydrogen, an alkyl group containing 1 to 12 carbon atoms and an alkoxy group containing 1 to 12 carbon atoms;

R8 represents hydrogen or a halogen atom;

R9 and R10 is each independently selected from the group consisting of hydrogen, an alkyl group containing 1 to 6 carbon atoms and an aryl group containing 1 to 12 carbon atoms; and R11 to R14 is each independently selected from the group consisting of an alkyl group containing 1 to 6 carbon atoms.

In a preferred embodiment, R1 to R7 is each independently selected from the group consisting of hydrogen, an alkyl group containing 1 to 8 carbon atoms, more preferably an alkyl group containing 1 to 6 carbon atoms, and an alkoxy group containing 1 to 8 carbon atoms, more preferably an alkoxy group containing 1 to 6 carbon atoms.

In a preferred embodiment, R9 and R10 is each independently selected from the group consisting of hydrogen, an alkyl group containing 1 to 8 carbon atoms, more preferably an alkyl group containing 1 to 6 carbon atoms, and an aryl group containing 1 to 12 carbon atoms, more preferably an alkyl group containing 1 to 10 carbon atoms.

In a preferred embodiment, R5 and R6 both represent hydrogen.

In a preferred embodiment, R11 to R14 all represent methyl and preferably R9 and/or R10 represent methyl or phenyl.

In a preferred embodiment, R8 represents a chlorine atom.

In a preferred embodiment, R9 and/or R10 represent a phenyl substituted by an alkyl group or a napthyl group.

In a particularly preferred embodiment, the color laser markable laminate includes a phenol stabilizer sterically hindered by a ring containing three nitrogen atoms and is selected from the group consisting of IS-1 to IS-4 shown here below.

The stabilizer is preferably present in a colour laser markable layer, but may also be present in another layer, for example, an outer layer. An outer layer is a layer more distant from the (opaque) core support than the laser markable layers on the same side of the opaque core support.

Coating Solvents

For coating the colour laser markable layers, one or more organic solvents may be used. The use of an organic solvent facilitates the dissolution of the polymeric binder and specific ingredients such as the infrared dye.

A preferred organic solvent is methylethylketone (MEK) because it combines a high solubilizing power for a wide range of ingredients and it provides, on coating the color laser markable layer, a good compromise between the fast drying of the layer and the danger of fire or explosion thereby allowing high coating speeds.

Transparent Polymeric Supports and Polymeric Overlays

The color laser markable layers are coated on a transparent polymeric support. If a polymeric foil, e.g. the polymeric overlay, is located between the color laser markable layer and the infrared laser for laser marking it, then the polymeric foil is transparent for the light of the infrared lasers in at least that area used for laser marking. The polymeric foils used a support or overlay are also transparent for visual light so that the color formed in the color laser markable layers can be well observed.

The polymeric support for a laser markable layer is preferably a transparent (bi)axially stretched polymeric support, more preferably a transparent (bi)axially stretched polyester support, and most preferably a transparent (bi) axially stretched polyethylene terephthalate support.

The transparent polymeric overlay is preferably selected from the group consisting of an axially stretched polyethylene terephthalate support, a biaxially stretched polyethylene terephthalate support, an axially stretched polyethylene naphthalate support and a biaxially stretched polyethylene naphthalate support.

In a very preferred embodiment of the security document precursor, both the transparent polymeric support for the colour laser markable layers and the outermost polymeric foil are a biaxially stretched polyethylene terephthalate support.

The color laser markable layer may be coated directly on the polymeric support or on a subbing layer provided on the polymeric support for improving adhesion of the laser markable layer, thereby making falsification through delamination more difficult.

Suitable polymeric supports and overlays include cellulose acetate propionate or cellulose acetate butyrate, polyesters such as polyethylene terephthalate and polyethylene naphthalate, polyamides, polycarbonates, polyimides, polyolefins, polyvinylchlorides, polyvinylacetals, polyethers and polysulphonamides.

In the most preferred embodiment, the transparent polymeric overlay(s) is a biaxially stretched polyethylene terephthalate foil (PET-C foil) which is very durable and resistant to mechanical influences (flexion, torsion, scratches), chemical substances, moisture and temperature ranges. This is especially useful for security documents such as identification cards and credit cards for which the average daily usage has augmented substantially from less than 1 time per week to 4 times per day. The card body has to withstand not only this increased usage, but also the associated storage conditions. Cards are no longer safely tucked away in cabinets at home or seldom-opened wallets, but are now loosely put away in pockets, purses, sport bags etc.—ready for immediate use. PVC (polyvinylchloride) is the most widely used material for plastic cards but has low durability of the card body, resulting in an effective lifetime of only 1-3 years, much lower than the lifetime of the often expensive electronic chips included in the card. Other materials like Teslin™ and ABS are only suitable for very low-end or single-use cards. PC (polycarbonate) can be used for longer-life and more secure ID cards, but has a high production cost and a low resistance to torsion, scratching and chemicals.

The transparent polymeric support and overlays are preferably a single component extrudate, but may also be co-extrudate. Examples of suitable co-extrudates are PET/PETG and PET/PC (PC=polycarbonate).

Polyester supports and especially polyethylene terephthalate supports are preferred because of their excellent properties of dimensional stability. When polyester is used as the support material, a subbing layer is preferably employed to improve the bonding of layers, foils and/or laminates to the support.

The manufacturing of PET-C foils and supports is well-known to a person skilled in the art of preparing suitable supports for silver halide photographic films. For example, GB 811066 (ICI) teaches a process to produce biaxially oriented polyethylene terephthalate foils and supports.

The polyethylene terephthalate is preferably biaxially stretched with a stretching factor of at least 2.0, more preferably at least 3.0 and most preferably a stretching factor of about 3.5. The temperature used during stretching is preferably about 160° C.

Core Supports

The core support may be a transparent or translucent support, but is preferably an opaque core support, more preferably having a white or a pastel color, most preferably a white color, for allowing easily readable information and viewable color images. The advantage of an opaque white core support is also that a color image is more appealing since colors usually are more vibrant with a white background.

Preferred opaque white core supports include resin coated paper supports, such as polyethylene coated paper and polypropylene coated paper, and synthetic paper supports such as Synaps™ synthetic paper of Agfa-Gevaert NV.

Other examples of useful high-quality polymeric supports for the present invention include opaque white polyesters and extrusion blends of polyethylene terephthalate and polypropylene. Also Teslin™ may be used as support.

Instead of a white support, a white opacifying layer can be coated onto a transparent polymeric support, such as those disclosed above. The opacifying layer preferably contains a white pigment with a refractive index greater than 1.60, preferably greater than 2.00, and most preferably greater than 2.60. The white pigments may be employed singly or in combination. Suitable white pigments include C.I. Pigment White 1, 3, 4, 5, 6, 7, 10, 11, 12, 14, 17, 18, 19, 21, 24, 25, 27, 28 and 32. Preferably titanium dioxide is used as pigment with a refractive index greater than 1.60. Titanium oxide occurs in the crystalline forms of anatase type, rutile type and brookite type. In the present invention the rutile type is preferred because it has a very high refractive index, exhibiting a high covering power.

Methods to obtain opaque polyethylene terephthalate and biaxially oriented films thereof have been disclosed in, e.g. US 2008238086 (AGFA).

Subbing Layers

The transparent polymeric supports, (opaque) core supports and polymeric overlays may be provided with one or more subbing layers. This has the advantage that the adhesion between a layer and the support is improved.

Useful subbing layers for this purpose are well known in the photographic art and include, for example, polymers of vinylidene chloride such as vinylidene chloride/acrylonitrile/acrylic acid terpolymers or vinylidene chloride/methyl acrylate/itaconic acid terpolymers.

The application of subbing layers is well-known in the art of manufacturing polyester supports for silver halide photographic films. For example, the preparation of such subbing layers is disclosed in U.S. Pat. No. 3,649,336 (AGFA), GB 1441591 (AGFA) and EP 2374602 A (AGFA).

Suitable vinylidene chloride copolymers include: the copolymer of vinylidene chloride, N-tert.-butylacrylamide, n-butyl acrylate, and N-vinyl pyrrolidone (e.g. 70:23:3:4), the copolymer of vinylidene chloride, N-tert.-butylacrylamide, n-butyl acrylate, and itaconic acid (e.g. 70:21:5:2), the copolymer of vinylidene chloride, N-tert.-butylacrylamide, and itaconic acid (e.g. 88:10:2), the copolymer of vinylidene chloride, n-butylmaleimide, and itaconic acid (e.g. 90:8:2), the copolymer of vinyl chloride, vinylidene chloride, and methacrylic acid (e.g. 65:30:5), the copolymer of vinylidene chloride, vinyl chloride, and itaconic acid (e.g. 70:26:4), the copolymer of vinyl chloride, n-butyl acrylate, and itaconic acid (e.g. 66:30:4), the copolymer of vinylidene chloride, n-butyl acrylate, and itaconic acid (e.g. 80:18:2), the copolymer of vinylidene chloride, methyl acrylate, and itaconic acid (e.g. 90:8:2), the copolymer of vinyl chloride, vinylidene chloride, N-tert.-butylacrylamide, and itaconic acid (e.g. 50:30:18:2). All the ratios given between brackets in the above-mentioned copolymers are ratios by weight.

In a preferred embodiment, the subbing layer has a dry thickness of no more than 2 μm or preferably no more than 200 mg/m$^2$.

Additional Layers and Foils

The security document precursor may include additional layers and/or foils. Such an additional layer can, for example, be an adhesive layer, a layer including UV stabilizers for protecting color images against bleaching or a layer containing an infrared antihalation dye for improving the sharpness of a colour laser marked image.

An adhesive foil may be interlaminated in order to make falsification by delamination more difficult. Instead of an adhesive foil, an adhesive layer may be applied as a layer on top of e.g. a color laser markable layer. However, the use of an adhesive foil instead of an adhesive layer has the advantage is that an adhesive foil does not extract some of the more soluble ingredients in the laser markable layer like an adhesive layer can do upon coating and drying. Variation in the concentration of the soluble ingredients leads to inconsistencies in the color production during laser marking.

Suitable adhesive foils include pressure-sensitive and thermo-sensitive adhesive foils. A range of so-called hot melt foils are well-known to one skilled in the art of security films and security documents.

A preferred hot melt foil in the present invention is a polyurethane foil. Suitable commercially available hot melt foils include Platilon™ ID5051, a 35 μm polyurethane foil available from Epurex. Other suitable hot melt foils are Scapa™ Thermofoil G160 and G161.

Another preferred adhesive foil is PETG. Contrary to biaxially oriented polyethylene terephthalate, a non-oriented PETG foil softens rapidly near the glass transition temperature and can thus also be used for adhesive purposes.

In a preferred embodiment, the adhesive foil is made of a non-chlorinated polymer. Adhesive foils based on a chlorinated polymer may cause background discoloration. Preferred adhesive foils include polyester, polyester urethane, polyether urethane or polyolefin hot melt foils.

If the adhesive is applied as an adhesive layer on a color laser markable layer or on polymeric support, this may be performed by methods such as solvent coating, casting, or hot melt extrusion.

Suitable thermo adhesive compositions are disclosed in WO 2009/063058 (AGFA). Preferred thermo adhesive layers are based on a hydroxyl-functional, partially-hydrolyzed vinyl chloride/vinyl acetate resin such as, for example, available under the trade name of UCAR™ VAGD Solution vinyl resin from Dow Chemical Company.

The adhesive foil preferably has a thickness smaller than 65 μm, more preferably smaller than 50 μm and most preferably smaller than 40 μm.

Security Features

The security document (precursor) may include one or more additional security features to increase the difficulty for falsifying the document.

To prevent forgeries of e.g. identification documents, different means of securing may be used. One solution consists in superimposing lines or guilloches on an identification picture such as a photograph. Other solutions consist in adding security elements such as information printed with ink that reacts to ultraviolet radiation, micro-letters concealed in an image or text etc.

Suitable other security features such as anti-copy patterns; guilloches; line patterns; endless text; miniprint; microprint; nanoprint; rainbow coloring; barcodes including 2D-barcodes; colored fibres; fluorescent fibres and planchettes; fluorescent pigments including fluorescent hi-lites; OVD (Optically Variable Device) and DOVID (Diffractive Optically Variable Image Device) such as holograms, 2D and 3D holograms, holograms with kinematic effects like Kinegrams™; overprint; relief embossing; perforations; metallic pigments; magnetic material; metameric colors; microchips such as RFID chips; images made with OVI (Optically Variable Ink) such as iridescent and photochromic ink; images made with thermochromic ink; phosphorescent pigments and dyes; watermarks including single tone, duotone and multitone watermarks; ghost images and security threads.

Apparatuses

A preferred embodiment of the present invention is an apparatus for producing a security document including a first device for producing a first part of a colour image by colour laser marking a security document precursor; and a second device for producing a second part of the colour image, wherein the second device includes no lasers.

The first device for producing a first part of a colour image by colour laser marking preferably includes two infrared lasers, one infrared laser having an emission wavelength between 1000 nm and 1200 nm and the other infrared laser having an emission wavelength between 800 nm and 1000 nm.

In one embodiment, the second device for producing a second part of the colour image is a thermosublimation printer.

In another embodiment, the second device for producing a second part of the colour image is an inkjet printer, more preferably a UV curable inkjet printer.

The first and second devices are integrated into the apparatus for producing a security document in such a manner that the first and second parts of a colour image produced by the devices are accurately aligned. The aligning of the first and second devices along the transport belongs to the normal technical skills of a person skilled in the art of constructing imaging apparatuses, and can even be accomplished by trial and error methods without calculations by the skilled person. In a preferred embodiment, the first and second devices are integrated in such a manner that a security document is first colour laser marked by the first device before being imaged by the second device. The advantage is that possible absorption in the infrared region of colour produced by the second device cannot interfere with the infrared absorption by the colour laser markable layers.

EXAMPLES

Materials

CCE is Bayhydrol H 2558, a anionic polyester urethane (37.3%) from BAYER.

Resorcinol from Sumitomo Chemicals.

Par is a dimethyltrimethylolamine formaldehyde resin from Cytec industries.

PAR-sol is a 40 wt % aqueous solution of Par.

PEA is Tospearl™ 120 from Momentive Performance materials.

PEA-sol is a 10 wt % (50/50) aqueous/ethanol dispersion of PEA.

Dowfax™ 2 A1 from Pilot Chemicals C is a Alkyldiphenyloxide disulfonate (4.5% wt %).

DOW-sol is a 2.5 wt % solution of Dowfax™ 2A1 in isopropanol.

Surfynol™ 420 from Air Products is a non ionic surfactant.

Surfynsol is a 2.5 wt % solution of Surfynol™ 420 in isopropanol.

MEK is an abbreviation used for methylethylketone.

Solvin™ 557RB is a vinylchloride-vinylacetate copolymer with 11% vinyl acetate, provided by SOLVAY.

SolvinSol is a 12.5 wt % solution of Solvin™ 557RB in MEK.

HDP is the hydrogen donor-precursor CASRN 129104-70-7 prepared according to the synthesis given on page 31 of EP 605149 A (JUDO PAPER) for the compound (19).

BLD is crystal violet lactone (CASRN 1552-42-7) available from YAMADA CHEMICAL CO.

MLD is a bisindolylphthalide leuco dye (CASRN50292-95-0) available as Pergascript™ Red 16B from BASF.

IR-2sol is a 0.15 wt % solution in MEK of the infrared dye CASRN 223717-84-8 having an absorption maximum at 1052 nm and was prepared in the same manner as disclosed by paragraphs [0150] to [0159] of EP 2463109 A (AGFA).

IR-3 was synthesized as follows via the intermediates IR-INT1 and IR-INT2:

Synthesis of IR-Absorber IR-INT1

IR-INT1
CASRN762276-49-3

The synthesis of intermediate INT-7 was performed as follows. 10 mol of dimethylformamide and 3 mol phosphoryl chloride were heated up to 65° C. Then 1 mol of cyclopentanon was dropped to this mixture. After one hour of stirring at 60° C., the reaction mixture was poured into 2 l water containing 7 mol sodium acetate. INT-7 was filtered and dried. The yield was 60%. The synthesis of the intermediate INT-B was performed as follows. 1 mol of 1,1,2-trimethyl-1H-benzo[e]indole (CASRN41532-84-7) and 2 mol of n-butyl bromide were stirred in 0.5 l sulfolane for four hours at 100° C. INT-B was filtered, washed with ethyl acetate and dried. The yield was 61%.

To a stirred mixture of INT-7 (4.75 g; 30 mmol) and INT-B (20.8 g; 60 mmol) in ethanol (100 mL) at room temperature were added consecutively triethylamine (12.1 g; 120 mmol) and acetic acid anhydride (12.2 g; 120 mmol). After heating to 50° C. for 1 hour, the reaction mixture was cooled to 20° C. and isopropanol (100 mL) was added. After 1 hour the precipitated IR-absorber was isolated by filtration, washed with EtOAc (20 mL) and dried in vacuo. Yield (crude) of IR-INT1 was 16 g (73%). The absorption maximum of IR-INT1 measured in methanol was 844 nm.

Synthesis of IR-Absorber IR-INT2

INT-7
CASRN121276-93-5

INT-B
CASRN762276-47-1

IR-INT1
CASRN762276-49-3

CF$_3$(CF$_2$)$_3$SO$_3^-$K$^+$
CASRN29420-49-3

-continued

IR-INT2

To a stirred suspension of IR-INT1 (16 g; 22 mmol) in acetonitrile (200 mL) was added potassium nonafluorobutanesulfonate (CASRN29420-49-3 from TCI Europe N.V.; 8.1 g; 24 mmol) and this mixture was heated at 70° C. for 15 minutes. After cooling to room temperature, water (100 mL) was drop wise added and after stirring for 2 hours the precipitated IR-absorber was isolated by filtration, washed consecutively with a mixture of acetonitrile/water 2/1 (20 mL), methyl tert. butylether (MTBE) (20 mL) and dried in vacuo. The yield of IR-INT2 was 14 g (67%). The absorption maximum of IR-INT2 measured in methanol was 844 nm.

Synthesis of Infrared Dye IR-3

To a stirred suspension of IR-INT2 (1.65 g; 1.73 mmol) in methanol (15 mL) under nitrogen at room temperature is added sodium benzenesulfinate (CASRN873-55-2 from Aldrich; 0.297 g; 1.81 mmol). After stirring for 2 hours the precipitated IR-absorber was isolated by filtration, washed with MTBE (5 mL) and dried in vacuo. The yield of IR-3 was 1.2 g (65%). The absorption maximum measured in methanol was 910 nm. The absorption maximum of IR-3 measured in $CH_2Cl_2$ including $6.5 \times 10^{-6}$ wt % of methanesulfonic acid was 923 nm.

IR-3sol is a 0.15 wt % solution in MEK of the infrared dye IR-3.

CORE is a 500 μm opaque PETG core available as PET-G 500 type 9311 from WOLFEN.

Measurement Methods

1. Optical Density

The optical density was measured in reflection using a spectrodensitometer Type Macbeth TR924 using a visual filter.

Example 1

This example illustrates the production of a security document in accordance with the invention. The security document is produced in two steps by first colour laser marking a security document precursor and then in a second step applying a complementary colour on the polymeric overlay by thermosublimation.

Preparation of PET-C Foils PET1

A coating composition SUB-1 was prepared by mixing the components according to Table 2 using a dissolver.

TABLE 2

| wt % of components | SUB-1 |
|---|---|
| deionized water | 76.66 |
| CCE | 18.45 |
| Resorcinol | 0.98 |
| PAR-sol | 0.57 |
| PEA-sol | 0.68 |
| DOW-sol | 1.33 |
| Surfynsol | 1.33 |

A 1100 μm thick polyethylene terephthalate sheet was first longitudinally stretched and then coated on both sides with the coating composition SUB-1 to a wet thickness of 10 μm. After drying, the longitudinally stretched and coated polyethylene terephthalate sheet was transversally stretched to produce a double side subbed 63 μm thick sheet PET1, which was transparent and glossy.

Preparation of Colour Laser Markable SecurityLaminate IL1

The coating compositions BCOL1 and MCOL1 were prepared in the same way by mixing the components according to Table 3 using a dissolver.

TABLE 3

| wt % of components | BCOL1 | MCOL1 |
|---|---|---|
| MEK | 16.87 | 0.07 |
| SolvinSol | 60.00 | 53.65 |
| IR-2sol | 20.00 | — |
| IR-3sol | — | 40.70 |
| HDP | 1.63 | 2.13 |
| BLD | 1.50 | — |
| MLD | — | 3.45 |

The coating composition BCOL1 was coated with an Elcometer Bird Film Applicator (from ELCOMETER INSTRUMENTS) on one side of the PET-C support PET1 at a coating thickness of 100 μm and subsequently dried for 2 minutes at 20° C. on the film applicator and for a further 15 minutes in an oven at 75° C.

Then the coating composition MCOL1 was coated with an Elcometer Bird Film Applicator (from ELCOMETER INSTRUMENTS) on the opposite side of the PET-C support PET1 coated with BCOL1 at a coating thickness of 100 μm and subsequently dried for 2 minutes at 20° C. on the film applicator and for a further 15 minutes in an oven at 75° C. to deliver the colour laser markable security laminate IL1.

Preparation of Security Document Precursor SDP-1

An assembly was made of, in order, a white opaque core support CORE, the colour laser markable security laminate IL1 and a polymeric overlay PET1, wherein the side coated with BCOL1 of the colour laser markable security laminate IL1 faces the white opaque core support CORE.

The assembly was then laminated into a security document precursor SDP-1 using an Oasys™ OLA6/7 plate laminator with the settings: LPT=130° C., LP=40 units, Hold=210 sec, HPT=130° C., HP=40 and ECT=50° C.

Evaluation and Results

The security document precursor SDP-1 was then first colour laser marked with a cyan and magenta part of a colour image by two infrared lasers of different emission wavelength, and then a yellow part of the colour image was printed in register with the cyan and magenta part of the colour image using thermosublimation printer.

A first optically pumped semiconductor laser emitting at 920 nm (Genesis MX 920-4000 M™ from COHERENT) was used for producing a magenta coloured wedge of ten 1 cm×1 cm square boxes of increasing optical density up to a maximum optical density of 1.29 in the colour laser markable layer coated from MCOL1. The laser was used at a power level of 4.9 W, a dither of 0.025, a scan speed of 100 mm/s and at a pulse repetition rate of 1.2 kHz.

A second optically pumped semiconductor laser emitting at 1064 nm (Genesis MX 1064-10000 M™ from COHERENT) was used for producing a blue coloured wedge of ten 1 cm×1 cm square boxes of increasing optical density up to a maximum optical density of 1.15 in the colour laser markable layer coated from BCOL1. The laser was used at a power level of 5.5, a dither of 0.025, a scan speed of 100 mm/s and at a pulse repetition rate of 1.2 kHz.

No colour contamination was observed in the different coloured wedges. This means that none of the lasers caused any colour formation in a laser markable layer other than the one for which it was intended. For example, the 920 nm laser caused no cyan colour formation in the laser markable layers coated from BCOL1.

Then the yellow part of the colour image was printed in register with the cyan and magenta part of the colour image using a thermosublimation printer Evolis™ New Pebble so that there was a 0.3 mm overlap with the cyan and magenta wedges. In the overlap with the cyan and magenta wedges, a green respectively orange colour was observed.

The maximum optical density $D_{max}$ measured for the cyan, magenta and yellow colour are given by Table 4.

TABLE 4

| Colour | $D_{max}$ |
|---|---|
| Cyan | 1.2 |
| Magenta | 1.3 |
| Yellow | 0.5 |

The invention claimed is:

1. A method of producing a security document, the method comprising the steps of:
   producing a first portion of a colour image by laser marking a security document precursor including a laser markable layer containing a leuco dye; and
   producing a second portion of the colour image by an imaging technique that is different from laser marking; wherein
   the first portion and the second portion of the colour image are in color registration with each other to form a single image.

2. The method according to claim 1, wherein the second portion of the colour image includes one or more chromatic colours.

3. The method according to claim 2, wherein the one or more chromatic colours includes a spot colour.

4. The method according to claim 1, wherein the imaging technique is thermosublimation printing.

5. The method according to claim 1, wherein the imaging technique is inkjet printing.

6. The method according to claim 5, wherein the inkjet printing includes UV curable inkjet printing.

7. The method according to claim 1, wherein the first portion of the colour image includes two laser markable layers.

8. The method according to claim 1, wherein the security document precursor includes one or more biaxially stretched polyester films.

9. The method according to claim 8, wherein outermost films of the security document precursor are biaxially stretched polyester films.

10. The method according to claim 9, wherein at least one colour laser markable layer of the first portion of the colour image is located between two of the biaxially stretched polyester films.

11. The method according to claim 8, wherein at least one colour laser markable layer of the first portion of the colour image is located between two of the biaxially stretched polyester films.

12. The method according to claim 1, wherein the imaging technique produces a yellow colour.

13. The method according to claim 1, wherein the imaging technique is inkjet printing, xerography, or thermosublimation.

14. The method according to claim 1, wherein the first portion and the second portion together define a single multicolour image.

15. The method according to claim 1, wherein the first portion and the second portion at least partially overlap each other to define colour that is different from a colour of the first portion and a colour of the second portion.

16. The method according to claim 1, wherein the first portion of the colour image includes a first colour laser markable layer and a second colour laser markable layer, the first colour laser markable layer producing a cyan colour or a blue colour and the second colour laser markable layer producing a magenta colour or a red colour.

17. The method according to claim 16, wherein the second portion of the colour image produces a yellow colour or a green colour.

* * * * *